United States Patent [19]

Norris

[11] 4,247,180
[45] Jan. 27, 1981

[54] CARD MOTION PICTURE APPARATUS WITH ADJUSTABLE BARREL CAM

[75] Inventor: Philip R. Norris, North Reading, Mass.

[73] Assignee: Polaroid Corporation, Cambridge, Mass.

[21] Appl. No.: 63,784

[22] Filed: Aug. 6, 1979

[51] Int. Cl.³ .............................................. G03B 41/00
[52] U.S. Cl. ................................... 352/82; 352/101; 352/160; 352/195
[58] Field of Search ................. 352/82, 101, 162, 160, 352/195

[56] References Cited

FOREIGN PATENT DOCUMENTS 581315 9/1924 France ...................................... 352/82
491888 9/1938 United Kingdom ....................... 352/82

Primary Examiner—Monroe H. Hayes
Attorney, Agent, or Firm—John S. Vale

[57] ABSTRACT

An improved motion picture apparatus for use with a card-like film unit and being of the type including a rotatable barrel cam for reciprocally driving the optical output end of a pivoting periscope boom, forming part of a scanning optical system, stepwise along a given locus over a row of sequential image positions at the film plane wherein the improvement comprises structure for axially displacing the barrel cam to adjust the location of the given locus so that at each of the steps the output end is in registration with a corresponding one of the image positions.

1 Claim, 4 Drawing Figures

CARD MOTION PICTURE APPARATUS WITH ADJUSTABLE BARREL CAM

BACKGROUND OF THE INVENTION

The present invention relates to the field of photography and, more specifically, to improvements in motion picture apparatus.

Recently, a motion picture system has been developed wherein a motion picture camera, projector and portable viewer are configured for use with a plurality of separate card-like film units, each having a plurality of sequential images thereon, rather than the conventional continuous film strip supplied on a reel.

The camera is disclosed in commonly-assigned copending applications U.S. Ser. No. 047,204 filed on June 11, 1979 by Philip R. Norris and Richard R. Wareham and entitled "Card Motion Picture System"; and U.S. Ser. No. 047,115 filed on June 11, 1979 by Philip R. Norris and entitled "Card Motion Picture Camera".

The projector and portable viewer are disclosed, respectively, in commonly-assigned copending applications U.S. Ser. No. 047,141 filed on June 11, 1979 by Philip R. Norris and entitled "Card Motion Picture Projection System"; and U.S. Ser. No. 047,057 filed on June 11, 1979 by Philip R. Norris and entitled "Portable Card Motion Picture Viewer".

The camera employs a scanning optical system including a movable portion that traverses across the film plane to record an arcuate row of sequential images on a portion of the film unit and a film advance system for incrementally advancing the film unit one row position after each traverse for recording the next successive arcuate row of images as the movable portion traverses in the opposite direction. Similar scanning optical systems and film advance systems are employed in the projector and viewer for playback.

The transparency film unit is preferably of a self-developing type having a format similar to film units manufactured by Polaroid Corporation, Cambridge, Massachusetts for use in SX-70 Land Cameras. With its generally square snapshot sized image area, approximately 200 sequential Super 8 image frames may be recorded thereon providing 10–12 seconds of running time for each recorded scene. Successive scenes are recorded on separate film units so that the motion picture may be easily edited for projection by changing the order of the individual film units.

The scanning optical system employed in the camera comprises a fixed portion including a focusing lens mounted on the camera housing for transmitting image-forming light along a first optical axis and a movable portion mounted on a pivoting periscope boom having its pivot axis, at one end, aligned with the first optical axis. The optical elements on the boom include a mirror and primary lens for transmitting light from the objective lens along a second axis substantially perpendicular to the first axis, and a second mirror for reflecting this light along a third axis, substantially parallel to the first axis, through an aperture stop or moving gate on the opposite or optical output end of the boom to the film plane.

The boom is pivotally mounted on a plate having an arcuate row of spaced exposure apertures therein, aligned with the arcuate path of travel of the output end of the boom, through which the portion of the film unit, located below the plate at the film plane, is exposed. These exposure apertures serve as a fixed gate for defining a plurality of image positions at the film plane.

The camera also includes means in the form of a barrel cam and cam follower coupled to the boom for advancing the output end stepwise along a given locus on the arcuate path to sequential imaging locations which correspond in number and spacing to the exposure apertures so that at each step, where the boom is stopped for exposure, the imaging location defined by the boom optics is a registration with a corresponding one of the imaging positions defined by one of the fixed gate exposure apertures.

Because the given locus of travel of the moving gate and the spacing of the sequential imaging locations along the locus are fixed by a double helix groove on the barrel cam, the question of whether or not the moving gate aperture will be in registration with the corresponding fixed gate apertures depends on how accurately the barrel cam is positioned along its axis line with respect to the fixed gate apertures. That is, if the barrel cam is not properly positioned on the axis line, the moving gate will be misregistered with each of the fixed gate apertures during its stepwise traverse along the fixed gate.

To insure such registation, not only does the barrel cam itself have to be accurately machined, but the members mounting it for rotation must be made to very close tolerances for proper axial placement thereby significantly increasing the cost of manufacture of the camera.

In the interests of reducing the manufacturing costs, it is highly desirable, and an object of this invention, to eliminate the need for such high tolerance mounting members and provide a means for adjusting the location of the given locus for accurate registration after the boom, barrel cam, and cam follower have been assembled on the fixed gate plate.

SUMMARY OF THE INVENTION

The present invention is directed to improvements in motion picture apparatus for use with a card-like film unit and of the type including means for supporting the film unit for movement in a given direction at a film plane; means for defining a plurality of spaced image positions at the film plane disposed in a row generally laterally of the given direction; optical means for forming an image and including a portion thereof movable along a path of travel aligned with the row to allow the portion to be brought into registered imaging relation with each of the image positions and means, including a barrel cam, for moving the portion stepwise along a given locus on the aligned path to sequential imaging locations corresponding in number and spacing to the image positions with the barrel cam being mounted for rotation about an axis extending generally laterally of a given direction such that the location of the barrel cam along the axis establishes the location of the given locus relative to the image positions.

The improvement is in the form of a factory adjustment for accurately positioning the barrel cam for proper registration and includes means for axially displacing the barrel cam to adjust the location of the given locus such that the imaging locations are in registration with the image positions.

In a preferred embodiment, the barrel cam includes a fixed axial shaft, the apparatus further includes a pair of laterally spaced support members on which the opposite ends of the shaft are rotatably and axially displaceably supported and the displacing means includes a bushing for rotatably receiving one end of the shaft, means for fixing the axial location of the bushing on the one end, and means for mounting the bushing on the corresponding one of the support members for lateral displacement relative thereto to effect axial displacement of the barrel cam.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the folowing description of the preferred embodiment when read in connection with the accompanying drawings wherein like numbers have been employed in the different figures to denote the same parts:

DESCRIPTION OF THE PREFERRED EMBODIMENT

Figure 1:
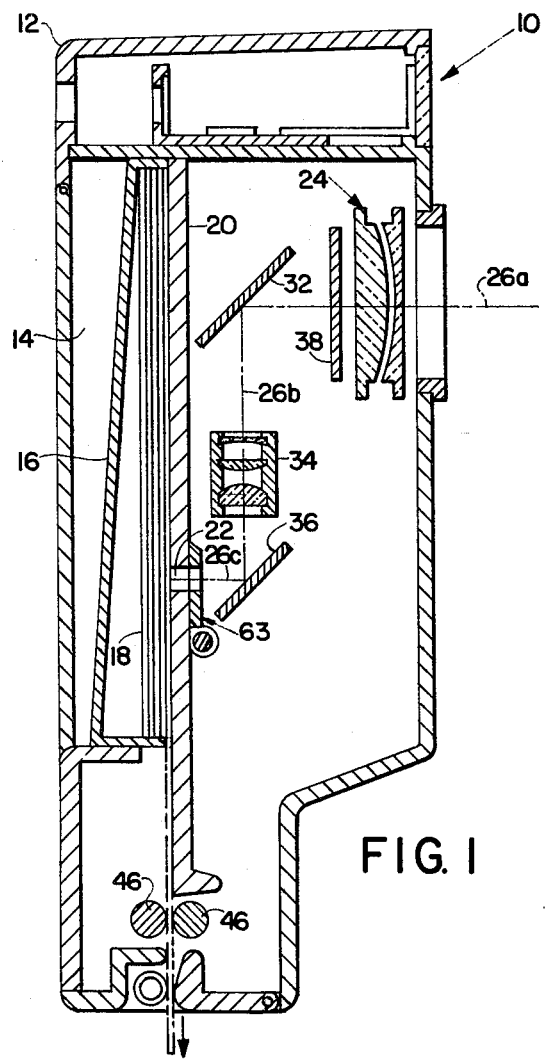
FIG. 1 is a cross-sectional, diagrammatic, elevational view of a motion picture apparatus embodying the present invention.
Figure 2:
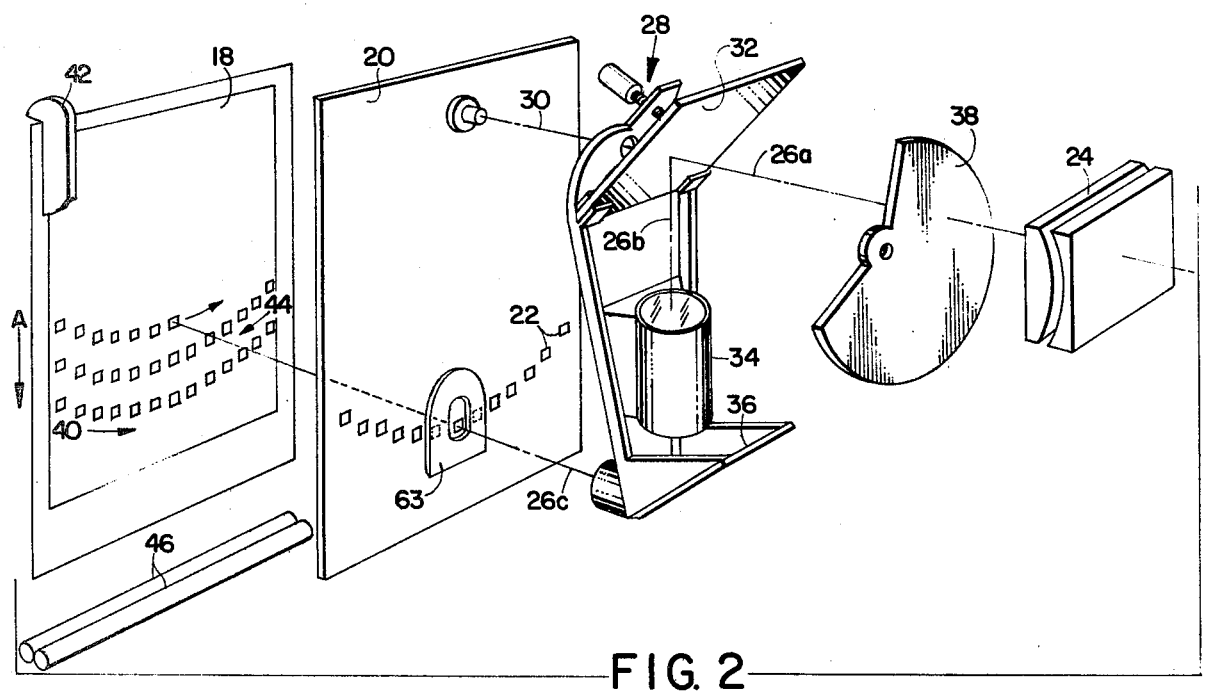
FIG. 2 is a perspective view, shown in exploded fashion, of selected components of the optical system and a film unit to show how these elements cooperate.

FIGS. 1 and 2 show in diagrammatic form a scanning motion picture camera 10 embodying the present invention. Camera 10 is of the type described in detail in the previously-noted copending applications U.S. Ser. No. 047,024 and U.S. Ser. No. 047,115. Although camera 10 has been chosen to illustrate the type of motion picture apparatus with which the present invention may be used, it will be understood that the inventive concepts to be described herein also apply to other apparatus of the same general type, such as the scanning motion picture projector and portable viewer described in the previously noted copending applications U.S. Ser. No. 047,141 and U.S. Ser. No. 047,057 respectively.

Camera 10 includes a housing 12 having a chamber 14 for receiving a film container 16 holding a stack of card-like transparency film units 18, preferably of the self-developing type.

The forwardmost film unit 18 is pressed against the underside of a plate 20 that serves to locate film unit 18 at the camera's film or focal plane. Plate 20 has a plurality of exposure apertures 22 therein disposed in an arcuate row and serving as a fixed gate to define a plurality of image positions at the film plane at which the film unit will be exposed sequentially by the camera's scanning optical system.

The optical system has a fixed section defined by an adjustable focusing lens 24 having an optical axis 26a and a scanning section supported on a pivoting support boom 28 mounted on plate 20 with its pivot axis 30 in alignment with optical axis 26a. The optical components supported on boom 28 include a first mirror 32, a second lens 34 and a second mirror 36 arranged on the opposite side of lens 34 in parallel relation to the first mirror 32. The mirror 32 and lens 34 transmit light from axis 26a along a second axis 26b which is at an angle to axis 26a and then mirror 36 reflects the light toward the row of exposure apertures 22 along a third optical axis 26c which is substantially parallel to axis 26a. By pivoting the boom 28 about the income axis 26a and laying down the images in an arcuate row, the lens-to-focal plane distance remains the same for each of the image positions defined by apertures 22 thereby minimizing image aberrations.

As best shown in FIG. 2, the output end of the boom 28 is initially positioned over the first aperture 22 at the left side of the arcuate row and the film is exposed with the first image. As diagrammatically shown, the exposure interval is controlled by a rotating sector shutter blade 38 mounted in position to block and unblock the optical path 26a between lens 24 and mirror 32. After the first image exposure, the boom is pivoted or driven stepwise by drive means to be described later to the next adjacent exposure aperture 22 in the direction indicated by arrow 40 on the film unit 18 for the next exposure. After the boom 28 has been sequentially indexed to all of the positions in the first row, the film unit 18 is advanced by a pick 42 in engagement with its trailing edge and forming part of the film advancing mechanism (not shown) one row position under the aperture 22 in the direction shown by arrow A. The boom 28 is then indexed in the opposite direction shown by arrow 44 to sequentially expose the second row of image frames. Once the second row of images has been formed, the film unit is once again advanced one row position and the process is repeated. It will be noted that the arcuate row of apertures 22 is disposed generally laterally of the direction of film advancement.

Following the exposure sequence, the film unit 18 is advanced between a pair of pressure-applying rollers 46 to distribute a processing fluid in a well-known manner between predetermined layers of the film unit for processing.

The film unit 18 may then be transferred to a projector of the type described in the previously-noted copending application U.S. Ser. No. 047,141 having a scanning optical system and film advance mechanism similar to that described for camera 10 for sequentially projecting the recorded images.

Figure 3:
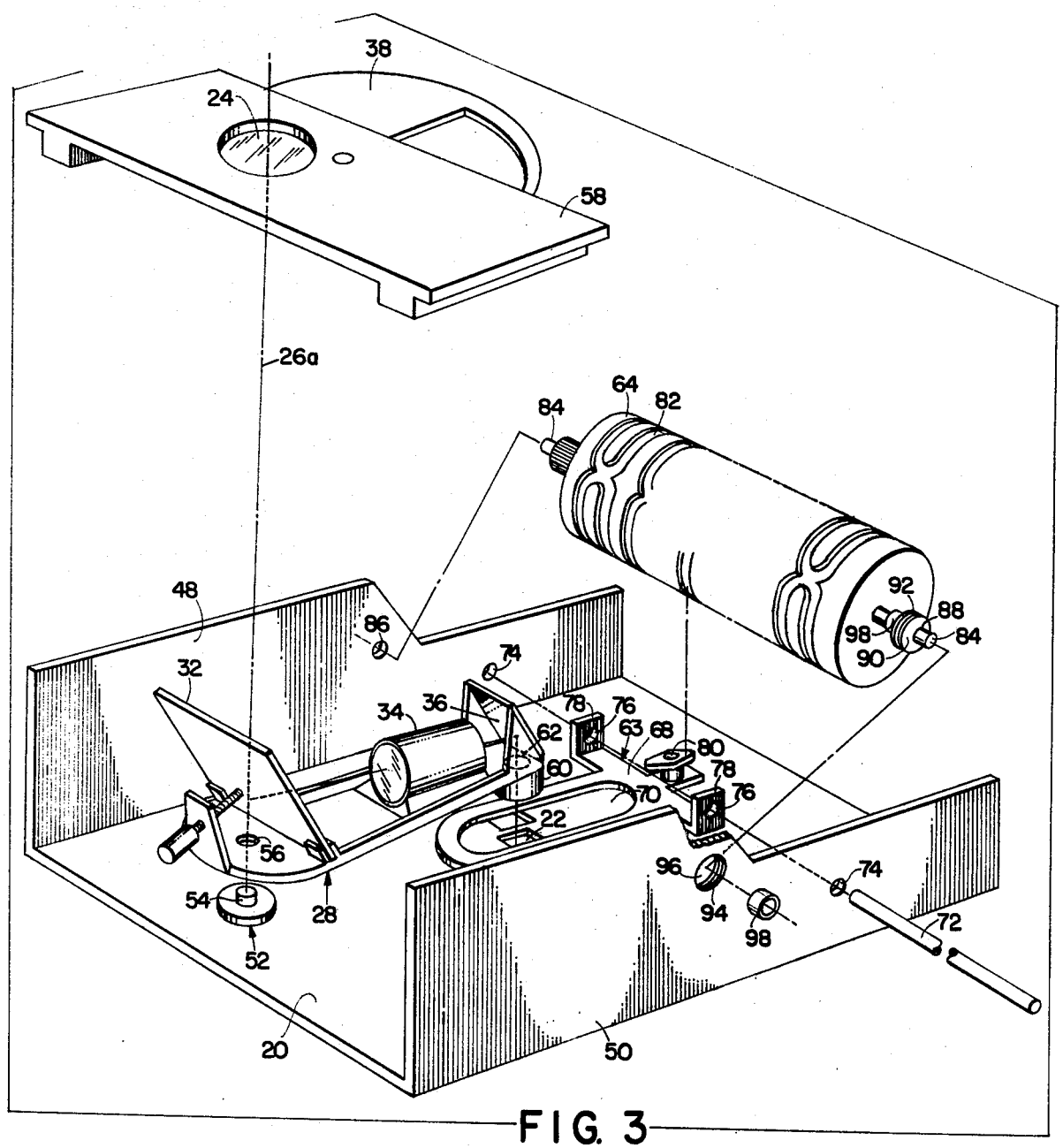
FIG. 3 is a perspective view, shown in exploded fashion, of the mounting structure for axially displacing the barrel cam relative to the fixed gate.
Figure 4:
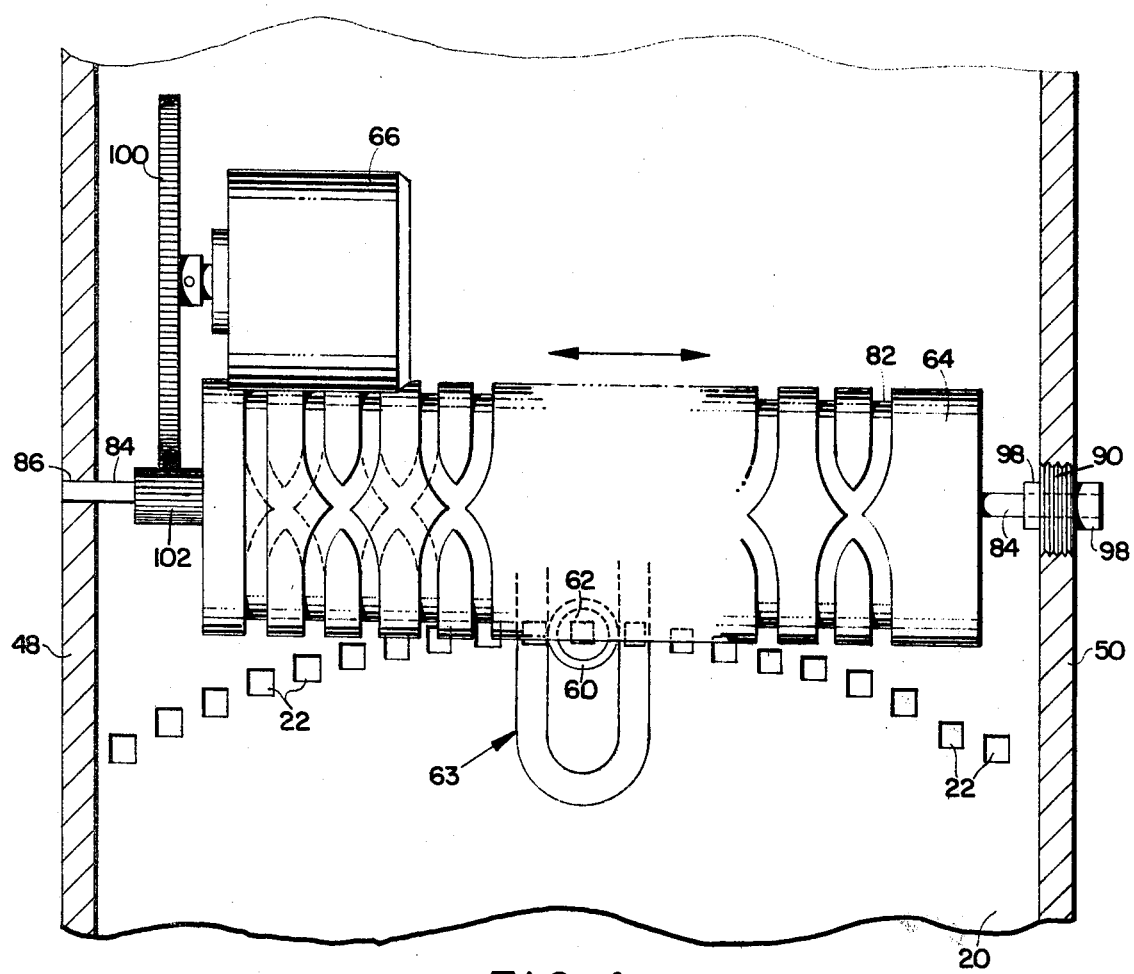
FIG. 4 is a plan view, partly in section , of the barrel cam and its adjustable structure.

With reference to FIGS. 3 and 4, where the essential elements of the preferred embodiment are shown in more detail, it will be seen that the plate 20 having the arcuate row of exposure apertures 22 therein to define the fixed gate serves as the bottom wall of a camera inner frame structure which also includes a pair of oppositely spaced side walls 48 and 50.

The boom 28 is pivotally connected near its end carrying first mirror 32 to a pivot bearing 52 that is secured to plate 20 along its longitudinal centerline and has an upstanding pivot pin 54 thereon which passes through an appropriate opening 56 on boom 28 to establish the boom pivot axis 30.

The adjustable focus lens 24 and the shutter blade 38 are mounted on a camera housing section 58 which attaches to the side walls 48 and 50 over boom 28 to locate the optical axis 26a of lens 24 in alignment with the boom pivot axis 30.

The free end of boom 28 mounting the second mirror 36 terminates in a hollow depending cylindrical member 60 arranged so that its axis coincides with the third optical axis 26c. Inside cylindrical member 60 is an aperture stop 62 serving as a moving gate which limits the field of image bearing light reflected from mirror 36 to the format defined by the exposure apertures 22 in the fixed gate. The boom 28 is dimensioned such that the moving gate 62 traverses an arcuate path of travel that is the same radial distance from the pivot point 30 as the exposure apertures 22 in the arcuate row which also utilizes pivot point 30 as its circular center. To make the sequential exposures, the boom will be pivoted to one side of the fixed gate with the moving gate 62 in registration with the first exposure aperture 22. The shutter 38 will be actuated to expose the first frame and then the boom 28 will be pivoted so that the moving gate 62 is in registration with the next exposure aperture 22 in the row where the boom will be stopped for the next sequential exposure.

To accomplish this function camera 10 includes means for reciprocally moving the free end of the boom 28 or the optical output end defined by the moving gate 62 over its arcuate path of travel in steps to sequential imaging positions which correspond in number and optical spacing to the corresponding exposure positions defined by the arcuate row of exposure apertures 22 in plate 20.

The means for reciprocally moving the output end of boom 28 include a linearly displaceable boom coupling member 63 and a rotating barrel cam 64 for reciprocally driving coupling member 63. The rotational drive for barrel cam 64 is provided by an electrical motor 66 coupled to cam 64 by a gear train to be described later.

The boom coupling member 63 includes a plate-like base 68 having an elongated longitudinally extending slot 70 therein for receiving the cylindrical member 60 at the output end of boom 28 that carries the moving gate aperture 62. Member 63 is mounted for sliding reciprocal motion laterally across plate 20 along a linear path defined by an elongated guide shaft 72 that extends between side walls 48 and 50 with its opposite ends captured in mounting holes 74 therein and passes through aligned shaft holes 76 in a pair of laterally spaced guide tabs 78 upstanding from base 68.

With the cylindrical member 60 of boom 28 captured in slot 70 and free to slide longitudinally therein, member 63 moves the output end of boom 28 along its arcuate path of travel over apertures 22 in repsonse to linear motion of member 63 along shaft 72.

Boom coupling member 63 is reciprocally driven along this linear path by the barrel cam 64 to which it is coupled by a boat-shaped cam follower 80 on base 68 which extends into the double helix grooves 82 of cam 64.

The barrel cam 64 is a generally cylindrical member including a fixed axial shaft 84 having its opposite ends rotatably coupled to the side walls 48 and 50 to locate cam 64 over boom coupling member 63 with the axis of rotation being substantially parallel to the linear path of member 63 and transverse to the direction of film advancement.

When so mounted as shown in FIG. 4, the cam follower 80 extends into the grooves 82 and, in response to rotation of cam 64, the boom coupling member 63 is driven stepwise across its linear path to index moving gate 62 to the series of imaging locations that correspond in number and spacing to the image positions defined by the arcuate row of apertures 22.

As is well-known in the art, the configuration of grooves 28 provides stepwise movement of the following member in response to continuous rotation of cam 64. That is, when the follower 80 is riding in that portion of the groove that is parallel to the direction of rotation, there is no axial displacement of the follower so that the output end of boom 28 is at a dwell position which should coincide with a corresponding image position defined by one of the apertures 22. During this dwell period, the rotating shutter blade 38 unblocks and then reblocks the optical path to effect exposure of the aligned frame. When blade 38 closes, the cam follower 80 is guided by a cross section of the groove 82 that is at an angle of the direction of rotation thereby causing member 63 to slide to its next dwell imaging location defined by the next parallel section of the groove. In this manner, cam 64 first causes the boom 28 to be indexed in one direction to each of the imaging positions in the arcuate row. After the last exposure has been made and the film unit 18 has advanced one row position, cam 64 then causes the boom 28 to be indexed in the opposite direction to expose the next arcuate row of frames.

The grooves 82 in cam 64 by their shape and dimensions establish a given locus of travel along the arcuate path for the output end of boom 28 as well as defining the sequential imaging locations therealong. However, whether these imaging locations will be in registration with the imaging positions depends on the location of cam 68 along the axis defined by shaft 84 in relation to the exposure apertures 22 defining the fixed gate. That is, if the cam 64 is mounted between side walls 48 and 50 at an axial location where the dwell positions defined by grooves 82 do not coincide with the corresponding image positions, then the moving gate 62 will not be in alignment with its corresponding exposure aperture 22.

In order to minimize manufacturing and assembly costs, it is preferable to mount the boom 28, coupling member 63 and cam 64 on the inner frame and then adjust the axial location of cam 64 for proper registration.

Accordingly, camera 10 is provided with means for adjusting the location of the given locus of travel of the outpu output end of boom 28 so that the imaging locations are in registration with the image positions. That is, cam 64 defines an arcuate path of a given length having imaging positions at predetermined locations therealong and the adjusting means will serve to move the entire path relative to the arcuate row of exposure apertures 22 so that the image locations coincide with the image positions.

In the preferred embodiment, the means for adjusting the location of the given locus include means for axially displacing barrel cam 64 after it has been rotatably mounted in its operative position.

As best shown in FIGS. 3 and 4, one end of cam axial shaft 84 is slidably received by a bearing hole 86 in side wall 48 and its opposite end extends through the bearing hole 88 of a bushing 90 having screw threads 92 about its periphery which mesh with complementary screw threads 94 about the periphery of a mounting hole 96 in the opposite side wall 50.

As best shown in FIG. 4, fixed inner and outer locking collars 98 fixed to the end of shaft 84 on opposite sides of bushing 90 prevent axial displacement of shaft 84 relative to bushing 90 but permit its free rotation therein.

The electrical drive motor 66 is supported adjacent side wall 48 by any suitable support means (not shown) and has an output gear 100 that is in mesh with an elongated pinion gear 102 fixed to shaft 84. Gear 102 is intentionally made wider than gear 100 to allow axial movement of gear 102 with shaft 84 without having gears 100 and 102 becoming disengaged.

Therefore, the barrel cam 64 may be axially displaced a short distance in either direction simply by rotating the threaded bushing 90 in its threaded mounting hole 96. During such displacement the opposite end of shaft 84 is free to slide in its bearing hole 86 to accommodate such movement.

With boom 28, boom coupling member 63 and barrel cam 64 assembled as shown in FIG. 4, the adjustment for registration is made as follows. The barrel cam 64 is rotated to locate the cam follower 80 at a dwell section of groove 82 thereby positioning the moving gate aperture 62 over the nearest exposure aperture 22 in the fixed gate. If the moving gate aperture 62 is observed to be on the left of this aperture 22, then the boom 28 must be pivoted in a clockwise direction to bring them into registration. This is accomplished by rotating bushing 90 in the appropriate direction to axially displace barrel cam 64 towards side wall 50. This displacement of cam 64 causes the boom coupling member 63 to be linearly displaced toward wall 50 by the same distance because the follower 80 is engaged with groove 82. Since cylindrical member 60 is captured in slot 70, the linear displacement of member 63 results in boom 28 being pivoted in a clockwise direction so that the moving gate aperture 62 moves to the right along the arcuate path. The adjustment is continued until registration is achieved. Of course, if the moving gate aperture 62 was initially observed to the right of the registration position, cam 64 would be axially displaced toward side wall 48 to rotate boom 28 in a counterclockwise direction to make the correction.

The axial displacement of barrel cam 64 in effect shifts the location of the given locus traversed by the output end of boom 28 relative to the arcuate row of image positions defined by apertures 22 because the length of the arcuate path and the sequential imaging locations thereon are fixed by the FIG. 8 groove 82 to correspond in number and spacing to the image positions. Thus by bringing the moving gate 62 into registration with the corresponding exposure aperture 22 for a particular dwell position, the registration of the other imaging locations with respect to their corresponding exposure aperture 22 is set automatically.

The adjustment provided by axially displacing cam 64 relates to mechanical corrections or adjustments that are made laterally with respect to the direction of film advancement. Adjustments for registering an image provided at the output end of boom 28 in a longitudinal direction with respect to the row of exposure apertures 22 is an optical adjustment that is carried out by adjusting the alignment and/or tilt of the optical elements carried on boom 28. Such adjustments are well-known to those skilled in the optical art and need not be discussed here to understand the present invention.

While the illustrated embodiment is directed to means for bringing a pivoting portion of the optical system into registration with sequential image positions disposed in an arcuate row, it will be understood that inventive concepts disclosed herein may be used with other apparatus wherein the image positions are arranged in a liner row and the optical system scans along a conforming linear path of travel.

It can be readily appreciated that this invention may be embodied and practiced in still other ways without departing from the scope or essential character thereof. Therefore, the embodiments described herein are illustrative and not restrictive, the scope of the invention being indicated by the following claims, and all inventions which come within the meaning of these claims are intended to be embraced threin.

What is claimed is:

1. An improved motion picture apparatus for use with a film unit and being of the type including means for supporting the film unit for movement in a given direction at a film plane, a fixed gate for defining a plurality of spaced image positions at said film plane disposed in an arcuate row extending generally laterally of said given direction, optical means for forming an image and including a portion thereof supported on a pivoting boom having a moving gate at an output end thereof movable along an arcuate path of travel aligned with said row to allow said moving gate to be brought into registered imaging relation with each of said image positions, and means, including a barrel cam and means for coupling said output end of said boom to said barrel cam in cam follower relation, for reciprocally moving said moving gate stepwise along a given locus on said aligned path to sequential imaging locations corresponding in number and spacing to said image positions, said barrel cam including a fixed axial shaft having opposite ends and being configured to be mounted between a pair of laterally spaced support members for rotaion about an axis extending generally laterally of said given direction such that the location of said barrel cam along said axis establishes the location of said given locus relative to said image positions, wherein said improvement comprises:

means for mounting said barrel cam on said pair of support members for rotation and axial displacement so that said coupling member causes said boom to pivot in response to linear axial displacement of said barrel cam to adjust the location of said given locus whereby said moving gate is in registration with a corresponding one of said image positions at each of said image locations;

said mounting means including means for mounting one end of said shaft on one of said support members for rotation and sliding motion relative thereto in the axial direction and a bushing for rotatably supporting the end of said shaft opposite said one end, means for fixing the axial location of said bushing on said opposite end, and means for mounting said bushing on the other of said support members for lateral displacement relative thereto to effect axial displacement of said barrel cam;

said means mounting said bushing for lateral displacement including a threaded peripheral portion of said bushing and a threaded opening in said other support member for receiving said threaded portion so that in response to rotation of said bushing it is displaced laterally relative to said other support member.

* * * * *